United States Patent
Villaescusa Alonso

(10) Patent No.: US 12,358,802 B2
(45) Date of Patent: Jul. 15, 2025

(54) CRYSTALLINE ZEOLITE-TYPE MATERIAL

(71) Applicant: UNIVERSITAT POLITÉCNICA DE VALÈNCIA, Valencia (ES)

(72) Inventor: Luis Angel Villaescusa Alonso, Valencia (ES)

(73) Assignee: UNIVERSITAT POLITECNICA DE VALENCIA, Valencia (ES)

( * ) Notice: Subject to any disclaimer, the term of this patent is extended or adjusted under 35 U.S.C. 154(b) by 510 days.

(21) Appl. No.: 17/801,688

(22) PCT Filed: Feb. 15, 2021

(86) PCT No.: PCT/ES2021/070106
§ 371 (c)(1),
(2) Date: Dec. 30, 2022

(87) PCT Pub. No.: WO2021/170890
PCT Pub. Date: Sep. 2, 2021

(65) Prior Publication Data
US 2023/0286819 A1    Sep. 14, 2023

(30) Foreign Application Priority Data
Feb. 24, 2020   (ES) .................. ES202030156

(51) Int. Cl.
*C01B 39/48*     (2006.01)
*B01J 29/04*     (2006.01)
*B01J 29/70*     (2006.01)
*B01J 35/63*     (2024.01)

(52) U.S. Cl.
CPC ............. *C01B 39/48* (2013.01); *B01J 29/041* (2013.01); *B01J 29/70* (2013.01); *B01J 35/638* (2024.01); *C01P 2002/72* (2013.01); *C01P 2006/14* (2013.01)

(58) Field of Classification Search
None
See application file for complete search history.

(56) References Cited

U.S. PATENT DOCUMENTS

| 2016/0031715 A1* | 2/2016 | Hedlund | B01J 35/30 |
| 2016/0060129 A1* | 3/2016 | Burton | B01J 20/18 |
| | | | 95/139 |

FOREIGN PATENT DOCUMENTS

| ES | 2208087 A1 | 6/2004 |
| WO | WO-2019141778 A1 * | 7/2018 |

OTHER PUBLICATIONS

Aliques, "Study of the synthesis of zeolites using cations derived from (phenylenedimethylene) bis (tripropylammonium) as structure directing agents", Doctoral Theses. Retrieved from the Internet; https://riunet.upv.es/handle/10251/109162, Universitat Politècnica de València, 2018, English abstract; 4 pages.

(Continued)

*Primary Examiner* — Michael Forrest
*Assistant Examiner* — Nicole Lee Quist
(74) *Attorney, Agent, or Firm* — Hayes Soloway P.C.

(57) ABSTRACT

The present invention relates to a microporous material of the zeolite type, known as IDM-1, the method for preparing same, and applications thereof. Said material may be entirely silicon-based or may include different elements at either the reticular or non-reticular positions. The present invention falls within the fields of crystalline silicas, zeolites and catalysts.

15 Claims, 5 Drawing Sheets

(56) References Cited

OTHER PUBLICATIONS

Villaescusa et al., "IDM-1: A Zeolite with Intersecting Medium and Extra-Large Pores Built as an Expansion of Zeolite MFI", Angewandte Chemie, 2020, vol. 59, Issue 28, pp. 11283-11286, 4 pages.
Villaescusa et al., "Sandwich-Type Zeolite Intergrowths with MFI and the Novel Extra-Large Pore IDM-1 as Ordered End-Members", Chemistry of Materials, 2021, vol. 33, pp. 7869-7877, 9 pages.

* cited by examiner

CRYSTALLINE ZEOLITE-TYPE MATERIAL

CROSS-REFERENCE TO RELATED APPLICATIONS AND PRIORITY

This patent application claims priority from PCT Application No. PCT/ES2021/070106 filed Feb. 15, 2021, which claims priority from Spanish Patent Application No. P202030156 filed Feb. 24, 2020. Each of these patent applications are herein incorporated by reference in their entirety.

The present invention relates to a microporous material of a zeolitic nature, referred to as IDM-1, to the method for obtaining same and to its applications. Said material can be purely siliceous or incorporate different elements, either in reticular or extra-reticular positions. The present invention is encompassed in the fields of crystalline silica, zeolites and catalysts.

BACKGROUND OF THE INVENTION

Zeolites are microporous crystalline materials of variable composition characterised by a crystalline lattice of tetrahedra $TO_4$ (wherein T represents atoms with a formal oxidation state of +3 or +4, such as Si, Ti, Al, Ge, B and Ga, that share all their vertices giving rise to a three-dimensional structure that contains channels and/or cavities of molecular dimensions. When some of the T atoms have an oxidation state lower than +4, the crystalline lattice formed has negative charges that are compensated by the presence of organic or inorganic cations in the channels or cavities. Organic molecules and $H_2O$ can also be housed in these channels and cavities, thus, in a general manner, the chemical composition of zeolites can be represented by the following empirical formula:

$$x(M_{1/n}XO_2)yYO_2zRwH_2O$$

wherein M is one or more organic or inorganic cations with charge +n, X is one or more trivalent elements, Y is one or more tetravalent elements, generally Si, and R is one or more organic substances. Although the nature of M, X, Y and R and the values of x, y, z, and w can, in general, be varied by post-synthesis treatments, the chemical composition of a zeolite (as synthesised or after calcination) has a characteristic range for each zeolite and the method for obtaining same.

Furthermore, a zeolite is further characterised by its crystalline structure, which defines a system of channels and cavities and gives rise to a specific X-ray diffraction pattern. In this way, zeolites differ from each other by their chemical composition range plus their X-ray diffraction pattern. Both characteristics (crystalline structure and chemical composition) also determine the physicochemical properties of each zeolite and its applicability in different industrial processes.

There are currently about 250 lattices accepted by the IZA (International Zeolite Association, iza-online.org), including both interrupted lattices, in which not all the tetrahedrons of the structure are connected, and materials containing stacking defects in some crystallographic directions.

Therefore, the search for new properties through the discovery of new zeolitic structures is an area of technological interest.

DESCRIPTION OF THE INVENTION

The present invention relates to a microporous crystalline material of a zeolitic nature, referred to as IDM-1, to the method for obtaining same and to its applications.

In a first aspect, the present invention relates to a crystalline material characterised in that it is a zeolite
having a general chemical formula $SiO_{(2-x)}(OH)_{2x}$, wherein x is equal to a value between 0.02 and 0.12; and
presents an X-ray diffractogram recorded with a Bragg-Brentano geometry diffractometer with a fixed divergence slit and using $K\alpha_1$ and $K\alpha_2$ radiation of Cu, and comprising the following angle values 2θ (°), and relative intensities (I/Io)·100, wherein the relative intensities are represented by e, f, m, j and d, with values of e=0-100, f=80-100, m=20-80, j=0-80 and d=0-20:

| 2θ (°) ± 0.30 (°) | (I/Io) · 100 |
|---|---|
| 5.00 | d |
| 7.06 | e |
| 7.92 | f |
| 8.31 | j |
| 8.79 | m |
| 9.01 | d |
| 9.16 | d |
| 9.38 | d |
| 9.84 | d |
| 10.05 | j |
| 10.96 | d |
| 11.28 | d |
| 11.60 | d |
| 11.86 | d |
| 12.48 | d |
| 12.84 | d |
| 13.22 | d |
| 13.94 | j |
| 14.20 | d |
| 14.80 | j |
| 14.95 | d |
| 15.12 | d |
| 15.42 | d |
| 15.64 | d |
| 15.91 | d |
| 16.12 | d |
| 16.5 | d |
| 16.64 | d |
| 17.23 | d |
| 17.66 | d |
| 17.89 | d |
| 18.39 | d |
| 18.92 | d |
| 19.25 | d |
| 19.43 | d |
| 19.57 | d |
| 20.08 | d |
| 20.24 | d |
| 20.37 | d |
| 20.58 | d |
| 20.87 | d |
| 21.03 | d |
| 21.46 | d |
| 21.80 | d |
| 22.14 | d |
| 22.34 | d |
| 22.69 | d |
| 23.14 | m |
| 23.35 | j |
| 23.73 | j |
| 23.99 | m |
| 24.15 | j |
| 24.43 | j |
| 24.77 | j |
| 25.38 | d |
| 25.6 | d |
| 26.02 | d |
| 26.36 | d |
| 26.69 | d |
| 27.04 | d |
| 27.48 | d |

-continued

| 2θ (°) ± 0.30 (°) | (I/Io) · 100 |
|---|---|
| 27.65 | d |
| 27.93 | d |
| 28.16 | d |
| 28.45 | d |
| 28.73 | d |
| 28.94 | d |
| 29.37 | d |
| 29.67 | d |
| 29.98 | d |

In the present invention, "zeolite or zeolitic material" is understood as microporous crystalline materials of variable composition characterised by a crystalline lattice of tetrahedra $TO_4$ (wherein T represents atoms with a formal oxidation state of +3 or +4 that share their vertices, giving rise to a three-dimensional structure that contains channels and/or cavities of molecular dimensions. It is also possible that the material presents an interrupted lattice wherein not all the O atoms are connected to Silicon atoms and form part of Si—OH groups (silanols), either structural or due to the presence of connectivity defects. The appearance of the latter may vary depending on the synthesis method and the calcination or subsequent treatments thereof and may play a role in their adsorption properties and have not been taken into account in the compositions expressed above.

In the present invention, "relative intensity or (I/Io)·100" is understood as the ratio obtained by dividing the intensity obtained for an angle 2θ in the x-ray diffraction diagram by the highest intensity obtained in said diagram and the result multiplied by 100, said operation is carried out for all intensities and independently in all the obtained diagrams, in such a way that each intensity of each diagram is in a range from 0 to 100.

In a preferred embodiment, the crystalline material has a micropore volume, measured from the value of the volume of $N_2$ adsorbed to $P/P^0$ (relative pressure) 0.3 and its density in liquid state, between 0.15 ml/g and 0.25 ml/g. Microporosity in crystalline materials provides regular channels and cavities of molecular size and this distribution of empty space is different for each zeolite. Therefore, they are able to act as molecular sieves and be used in highly selective separation processes. They are also important in catalysis, since these cavities act as microreactors capable of influencing the distribution of products, providing different selectivities depending on the zeolite used.

In the present invention, "micropore" is understood as those pores with a size of less than 2 nm. And "microporous material" is understood as those materials that have pores with a size of less than 2 nm.

In another preferred embodiment, the crystalline material has a mesopore volume, measured from the value of the volume of $N_2$ adsorbed to $P/P^0$ 0.3 and its density in liquid state, between 0.040 ml/g and 0.300 ml/g. The mesopore volume is calculated as the difference between the total adsorbed volume and the micropore volume. These mesopore sizes are adequate since they facilitate access to the micropores of the reagents and the exit of the products. Moreover, they are also suitable for so-called high-speed reactions where smaller pore sizes such as micropores, due to their small size, are unsuitable for said reactions since the speed at which the catalytic processes occur prevents the use of the possible active centres of the material due to steric hindrances because of their size.

In the present invention, "mesopore" is understood as those pores with a size between 2 nm and 50 nm. And "mesoporous material" is understood as those materials that present pores with sizes between 2 nm and 50 nm.

In another preferred embodiment of the crystalline material of the present invention, silicon is isomorphically substituted by an element selected from Al, B, Ga, Fe, Ti, Sn, Zn, V, and any combination thereof.

In another preferred embodiment of the crystalline material of the present invention, silicon is substituted by Al in a Si/Al ratio of more than 12. More preferably, the value of the Si/Al ratio is more than 30. And even more preferably, the value of the Si/Al ratio is between 30 and 60. In this way, the lattice acquires negative charges that are compensated by mobile and exchangeable cations in extra-reticular positions.

In another preferred embodiment the crystalline material of the present invention, silicon is replaced by Ti in a Si/Ti ratio of more than 10. More preferably, the value of the Si/Ti ratio is more than 30. And even more preferably, the value of the Si/Ti ratio is between 30 and 60.

Another aspect of the invention relates to the method for obtaining the crystalline material characterised in that it comprises the following steps
 a) adding at least one source of silica to an aqueous solution of a salt of the dication (p-phenylenedimethylene)bis(tripropylammonium);
 b) adding to the mixture obtained in step (a) a source of fluorine $F^-$ selected from hydrofluoric acid and a fluorine salt, more preferably $NH_4F$, up to a pH between 12 and 5, more preferably between 10 and 6, and even more preferably between 9 and 7, homogenising, wherein the molar ratio of the mixture is $SiO_2$:a $TF_2$:b $H_2O$, wherein T represents the cation (p-Phenylenedimethylene)bis(tripropylammonium) and a=0.05-2 and more preferably a=0.2-1.5, and wherein b=2-100, more preferably b=5-50, and even more preferably b=7-50, and still more preferably b=7-17; and
 c) the mixture is introduced into a digestion pump and left with or without stirring in an oven at a temperature between 8° and 200° C., preferably between 13° and 180° C., for a period of time between 1 h and 50 days;
 d) cooling the mixture and obtaining the solid by filtration or by centrifugation, washing with water and drying,
 e) calcining in the presence of an oxidising agent the dry product obtained in step (d) at a temperature between 300° C. and 1000° C. for a period of time between 0.5 h and 2 days.

The dication (p-Phenylenedimethylene)bis(tripropylammonium) (FIG. 1) is the so-called organic structure-directing agent. Through its molecular geometry and electronic density distribution, it organises the silica, incorporating itself into the lattice, determining, to a large degree, the distribution of the empty space of the crystallised material as it is subsequently eliminated from the lattice.

In a preferred embodiment of the method, the source of silicon of step (a) is selected from tetraethyl orthosilicate (TEOS), colloidal silica, amorphous silica and any other source of silica, as are other alkoxides or water glasses.

The calcination step dislodges the host agents from the lattice and provides empty space for the corresponding applications. Prior to this step, the composition of uncalcined zeolites prepared in a fluoride medium (as is the case) usually contains the organic cations (T) with which it has been prepared occluded in the channels and fluoride anions (F), occluded in the holes that the zeolites have in their structure. In general, the charges provided by the cation are compensated by the fluoride anions and by the isomorphic substitution of elements in an oxidation state of +4 by elements in an oxidation state of +3

In a preferred embodiment of the method, the dication (p-Phenylenedimethylene)bis(tripropylammonium) is found as (p-Phenylenedimethylene)bis(tripropylammonium) hydroxide, and is obtained by anion exchange from the corresponding halide.

In another preferred embodiment of the method, alkoxides are used as a source of silica, after step (a) and before step (b) and the mixture obtained is left to rest for a period of time between 1 h and 5 days. In a more preferred embodiment, stirring is applied during this period of time; in this way, both the hydrolysis of the source of silicon in the reaction medium and the evaporation of both the ethanol generated in said hydrolysis and a certain amount of water are favoured. These quantities are known as the mass lost by evaporation (Am). The amount of water is readjusted to a ratio of $H_2O:SiO_2$ between 2 and 100, preferably between 5 and 50, more preferably between 7 and 50, and even more preferably between 7 and 17.

In another preferred embodiment of the method, the heating in a digestion pump of step (c) is selected from a static autoclave or a stirring autoclave.

In another preferred embodiment of the method, step (e) is replaced by a step in which the product obtained in step (d) is chemically treated to dislodge the organic compound from the structure.

In another preferred embodiment of the method, step (e) is replaced by a step in which the product obtained in step (d) is photochemically treated to dislodge the organic compound from the structure.

In another preferred embodiment of the method for obtaining the crystalline material for obtaining the halide of the dication (p-Phenylenedimethylene)bis(tripropylammonium) of step (a), it comprises adding tripropylamine dropwise to a solution of 1,4-bis(chloromethyl)benzene in an ice bath, leaving under reflux and stirring for a period of time between 3 h and 7 days and separating the solvent to obtain a solid and wash it.

In another preferred embodiment of the method for obtaining the crystalline material for obtaining the halide of the dication (p-Phenylenedimethylene)bis(tripropylammonium) of step (a), it comprises dissolving 1,4-bis(chloromethyl)benzene in an organic solvent selected from an alcoholic solvent, chloroform, acetonitrile and tetrahydrofuran, more preferably ethanol, in an amount of between 1.5% and 2% by weight with respect to the organic solvent and tripropylamine is added dropwise to that solution in an ice bath, leaving under reflux and stirring for a period of time between 3 h and 7 days and separating the solvent to obtain a solid that is washed with acetone.

In another preferred embodiment of the method for obtaining the crystalline material in step (c), a source of an element selected from Al, B, Ga, Fe, Ti, Sn, Zn, V and any combination thereof, is also added in a molar ratio between said element and silicon of between 0.001 and 0.2000, and preferably between 0.001 and 0.100.

In a more preferred embodiment, the precursor is aluminium and wherein said precursor is selected from aluminium isopropoxide, aluminium nitrate or any other aluminium salt or alkoxide, in a molar ratio between the precursor in its equivalent oxide form, $Al_2O_3$ and $SiO_2$ between 0.0005 and 0.1000, and preferably between 0.0005 and 0.0500.

The isomorphic substitution of Silicon for Aluminium incorporates a negative charge in the lattice. Therefore, the maximum amount of Aluminium depends on the number of charges provided by the organic cation therein.

In a more preferred embodiment, the precursor is titanium and wherein said precursor is selected from titanium isopropoxide, tetraethyl orthotitanate, or any other titanium compound, in a molar ratio between the precursor in its equivalent oxide form, $TiO_2$ and $SiO_2$ between 0.0005 and 0.1000, and preferably between 0.0005 and 0.0500.

A third aspect of the present invention relates to the use of the previously described crystalline material as a catalyst. In a more preferred embodiment, the crystalline material wherein Si is replaced by Al is used as an acid catalyst.

In a more preferred embodiment, the use of the crystalline material of the present invention is as a redox catalyst. It is achieved in two ways, (1) by introducing active redox centres in the lattice, e.g., Titanium and (2) by taking advantage of the presence of reticular Aluminium to incorporate cationic species in extra-reticular positions associated with that reticular aluminium (Cu, Co, Fe, etc.).

In a more preferred embodiment, the use of the crystalline material of the present invention is as a basic catalyst.

Another aspect of the invention relates to the use of the crystalline material of the present invention for the separation of molecules as a molecular sieve or by diffusion differences through the empty space thereof.

Throughout the description and the claims, the word "comprises" and its variants do not intend to exclude other technical features, additives, components or steps. For those skilled in the art, other objects, advantages and features of the invention may be partially deduced from both the description and the embodiment of the invention. The following examples and figures are provided by way of illustration and are not intended to limit the present invention.

EXAMPLES

Next, the invention will be illustrated by means of assays carried out by the inventors that demonstrate the effectiveness of the product of the invention.

Example 1

Figure 1:
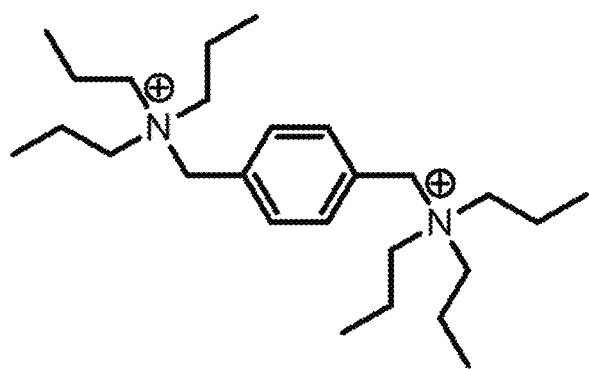
FIG. 1. Cation used as structure-directing agent in the synthesis of the zeolite IDM-1.

This example illustrates the preparation of (p-Phenylenedimethylene)bis(tripropylammonium) hydroxide (FIG. 1).

5 g of g of 1,4-bis(chloromethyl)benzene, 300 g of ethanol are introduced in a 500 ml flask. About 24.5 g of tripropylamine is added to this mixture with stirring, dropwise and in an ice bath. After 3 days under reflux and stirring, the mixture is evaporated in a rotary evaporator until a white solid is obtained. After washing the obtained solid with acetone, the final mass of product obtained is 13.1 g. The nuclear magnetic resonance spectrum indicates that the solid obtained is the chloride of the dication (p-Phenylenedimethylene)bis(tripropylammonium).

The hydroxide form of the dication is obtained by anion exchange using an exchange resin (Dowex Monosphere 550A hydroxide form, Sigma-Aldrich)

100 g of resin are added to a solution of 13 g of the previous product in 194.02 g of water and it is left under stirring for about 12 hours. After filtering the resin, the solution is titrated with HCl (aq.) using phenolphthalein as indicator, finding an efficiency in the exchange of 82%. This solution can be concentrated in a rotary evaporator for use in the synthesis of IDM-1, and its final concentration is obtained by a new titration.

Example 2

This example illustrates the preparation of purely siliceous IDM-1, using (p-Phenylenedimethylene)bis(tripropylammonium) hydroxide as the organic structure-directing agent.

3.47 g of tetraethyl orthosilicate (TEOS) are added to 7.17 g of a solution containing 1.16 mmol of (p-Phenylenedimethylene)bis(tripropylammonium) hydroxide per gram of solution, obtained in the manner described in example 1, and stirred, allowing the evaporation of the ethanol produced in the hydrolysis of TEOS together with water.

When the evaporation loss is 5.51 g, 0.35 g of HF (aq.) (48%, Aldrich) is added and homogenised by hand with the spatula. The paste obtained is introduced into an autoclave lined internally with polytetrafluoroethylene and remains at 150° C. for 10 days. As such, the autoclave cools down, the solid produced is separated by filtration, it is washed with water and it is dried at 60° C.

Figure 2:
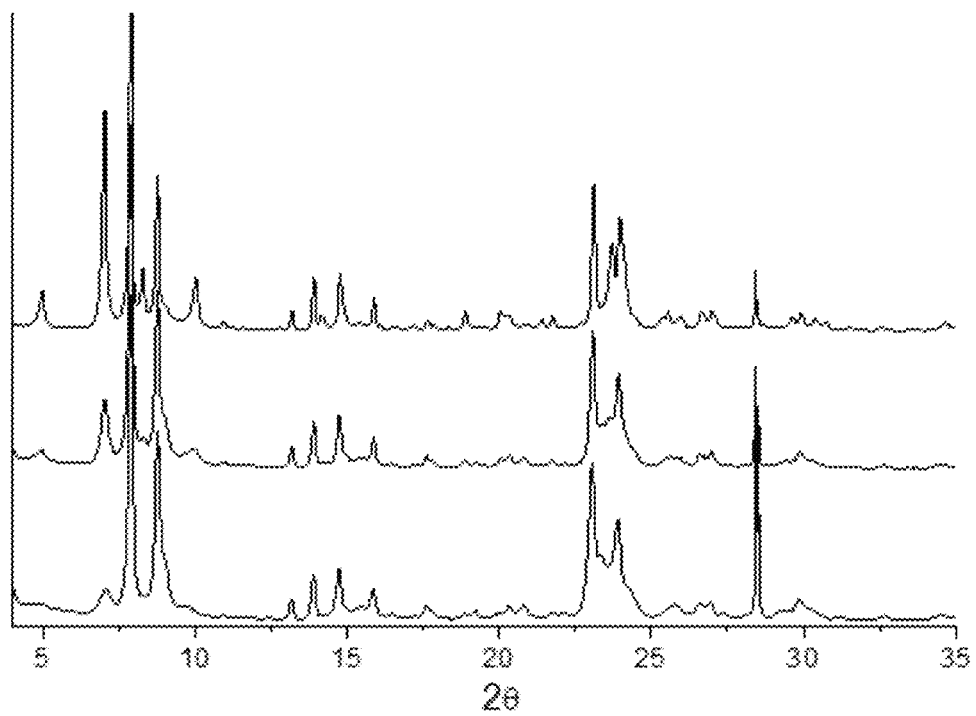
FIG. 2. Diffractograms of the IDM-1 materials obtained in the experiments of the zeolites in examples (from top to bottom) 2, 3 and 4. The reflection at 28.44 corresponds to Si, used as internal standard.

Lastly, the product obtained and characterised is calcined at 550° C. for 5 hours, thus obtaining a white solid that indicates that the calcination has dislodged the host agents from the lattice and has provided empty space for the corresponding applications and that is characterised by X-ray diffraction, bottom diagram of FIG. 2, where it presents an X-ray diffractogram recorded with a Bruker diffractometer with Bragg-Brentano geometry with a fixed divergence slit and using $K\alpha_1$ and $K\alpha_2$ radiation of Cu comprising the following angle values $2\theta$ (°), and relative intensities (I/Io)·100, wherein the relative intensities are represented by f, m and d, with values of f=80-100, m=20-80 and d=0-20:

| $2\theta$ (°) ± 0.30 (°) | (I/Io) · 100 |
|---|---|
| 4.87 | d |
| 7.06 | d |
| 7.88 | f |
| 8.33 | d |
| 8.75 | m |
| 9.03 | d |
| 9.73 | d |
| 10.93 | d |
| 11.84 | d |
| 12.45 | d |
| 13.17 | d |
| 13.89 | d |
| 14.73 | d |
| 15.43 | d |
| 15.85 | d |
| 16.46 | d |
| 17.22 | d |
| 17.6 | d |

-continued

| $2\theta$ (°) ± 0.30 (°) | (I/Io) · 100 |
|---|---|
| 17.79 | d |
| 18.16 | d |
| 18.86 | d |
| 19.19 | d |
| 19.97 | d |
| 20.31 | d |
| 20.81 | d |
| 21.25 | d |
| 21.74 | d |
| 22.13 | d |
| 23.03 | m |
| 23.38 | d |
| 23.89 | m |
| 24.28 | d |
| 24.5 | d |
| 25.48 | d |
| 25.79 | d |
| 26.59 | d |
| 26.95 | d |
| 27.39 | d |
| 28.12 | d |
| 29.3 | d |
| 29.86 | d |
| 30.22 | d |
| 30.5 | d |
| 31.24 | d |
| 32.64 | d |
| 33.4 | d |
| 33.7 | d |
| 34.53 | d |

Example 3

This example illustrates the preparation of purely siliceous IDM-1, using the dication of (p-Phenylenedimethylene)bis(tripropylammonium) as organic structure-directing agent in its hydroxide form of (p-Phenylenedimethylene)bis(tripropylammonium).

It follows example 2 exactly, except that the mass evaporation loss is 5.81 g and the reaction time in the autoclave is 17 days at 150° C.

It is characterised by X-ray diffraction, middle diagram of FIG. 2, where it presents an X-ray diffractogram recorded with a Bruker diffractometer with Bragg-Brentano geometry with a fixed divergence slit and using $K\alpha_1$ and $K\alpha_2$ radiation of Cu comprising the following angle values $2\theta$ (°), and relative intensities (I/Io)·100, wherein the relative intensities are represented by f, m and d, with values of f=80-100, m=20-80 and d=0-20:

| 2theta | | i/io * 100 | |
|---|---|---|---|
| 4.93 | 32 | 3.20 | d |
| 7.05 | 182 | 18.20 | d |
| 7.9 | 1000 | 100.00 | f |
| 8.35 | 63 | 6.30 | d |
| 8.77 | 466 | 46.60 | m |
| 9.03 | 110 | 11.00 | d |
| 9.92 | 69 | 6.90 | d |
| 10.95 | 14 | 1.40 | d |
| 11.86 | 6 | 0.60 | d |
| 13.2 | 63 | 6.30 | d |
| 13.92 | 132 | 13.20 | d |
| 14.19 | 11 | 1.10 | d |
| 14.76 | 147 | 14.70 | d |
| 15.01 | 28 | 2.80 | d |
| 15.49 | 31 | 3.10 | d |
| 15.89 | 86 | 8.60 | d |
| 16.51 | 12 | 1.20 | d |
| 17.22 | 7 | 0.70 | d |

-continued

| 2theta | i/io * 100 | | |
|---|---|---|---|
| 17.62 | 25 | 2.50 | d |
| 17.81 | 17 | 1.70 | d |
| 18.91 | 22 | 2.20 | d |
| 19.23 | 16 | 1.60 | d |
| 19.57 | 5 | 0.50 | d |
| 20.07 | 22 | 2.20 | d |
| 20.37 | 33 | 3.30 | d |
| 20.85 | 31 | 3.10 | d |
| 21.38 | 13 | 1.30 | d |
| 21.79 | 23 | 2.30 | d |
| 22.18 | 14 | 1.40 | d |
| 23.1 | 392 | 39.20 | m |
| 23.44 | 92 | 9.20 | d |
| 23.66 | 77 | 7.70 | d |
| 23.95 | 253 | 25.30 | m |
| 24.25 | 43 | 4.30 | d |
| 24.47 | 37 | 3.70 | d |
| 25.62 | 33 | 3.30 | d |
| 25.94 | 25 | 2.50 | d |
| 26.22 | 9 | 0.90 | d |
| 26.64 | 41 | 4.10 | d |
| 27 | 44 | 4.40 | d |
| 27.44 | 20 | 2.00 | d |
| 28.2 | 16 | 1.60 | d |
| 29.4 | 24 | 2.40 | d |
| 29.9 | 47 | 4.70 | d |
| 30.26 | 23 | 2.30 | d |
| 30.63 | 13 | 1.30 | d |
| 31.23 | 6 | 0.60 | d |
| 31.58 | 6 | 0.60 | d |
| 32.68 | 10 | 1.00 | d |
| 33.45 | 4 | 0.40 | d |
| 33.74 | 2 | 0.20 | d |
| 34.62 | 16 | 1.60 | d |

Example 4

This example illustrates the preparation of purely siliceous IDM-1, using (p-Phenylenedimethylene)bis(tripropylammonium) hydroxide as the organic structure-directing agent.

It follows example 2 exactly, except that the evaporation loss is 6.11 g and the reaction time is 10 days in the autoclave at 150° C.

It is characterised by X-ray diffraction, top diagram of FIG. 2, where it presents an X-ray diffractogram recorded with a Bruker diffractometer with Bragg-Brentano geometry with a fixed divergence slit and using $K\alpha_1$ and $K\alpha_2$ radiation of Cu comprising the following angle values $2\theta$ (°), and relative intensities (I/Io)·100, wherein the relative intensities are represented by f, m and d, with values of f=80-100, m=20-80 and d=0-20:

| 2θ (°) ± 0.30 (°) | (I/Io) · 100 |
|---|---|
| 5.00 | d |
| 7.06 | m |
| 7.92 | f |
| 8.31 | d |
| 8.79 | m |
| 9.01 | d |
| 9.16 | d |
| 9.38 | d |
| 10.05 | d |
| 10.96 | d |
| 11.28 | d |
| 11.60 | d |
| 12.84 | d |
| 13.22 | d |
| 13.94 | d |

-continued

| 2θ (°) ± 0.30 (°) | (I/Io) · 100 |
|---|---|
| 14.20 | d |
| 14.80 | d |
| 14.95 | d |
| 15.12 | d |
| 15.42 | d |
| 15.64 | d |
| 15.91 | d |
| 16.12 | d |
| 16.64 | d |
| 17.23 | d |
| 17.66 | d |
| 17.89 | d |
| 18.39 | d |
| 18.92 | d |
| 19.25 | d |
| 19.43 | d |
| 19.57 | d |
| 20.08 | d |
| 20.24 | d |
| 20.37 | d |
| 20.58 | d |
| 20.87 | d |
| 21.03 | d |
| 21.46 | d |
| 21.80 | d |
| 22.14 | d |
| 22.34 | d |
| 22.69 | d |
| 23.14 | m |
| 23.73 | m |
| 23.99 | m |
| 24.15 | d |
| 24.53 | d |
| 25.38 | d |
| 25.60 | d |
| 26.02 | d |
| 26.36 | d |
| 26.69 | d |
| 27.04 | d |
| 27.48 | d |
| 27.65 | d |
| 27.93 | d |
| 28.16 | d |
| 28.73 | d |
| 28.94 | d |
| 29.37 | d |
| 29.67 | d |
| 29.98 | d |

Example 5

$N_2$ adsorption isotherms in the calcined samples of examples 2 and 3.

Figure 3:
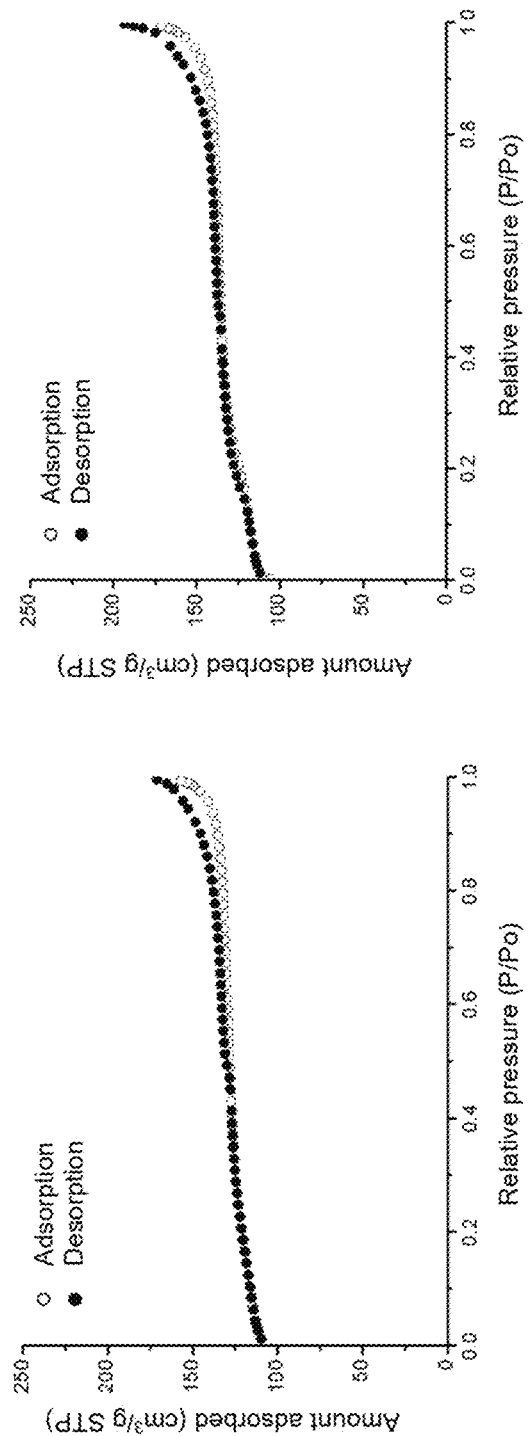
FIG. 3. Adsorption and desorption isotherms of the IDM-1 solids calcined at 550° C. prepared in examples 2 and 3 (above and below, respectively).
Figure 4:
FIG. 4. SEM images of the IDM-1 zeolites obtained in examples 2, 3 and 4.
Figure 4:
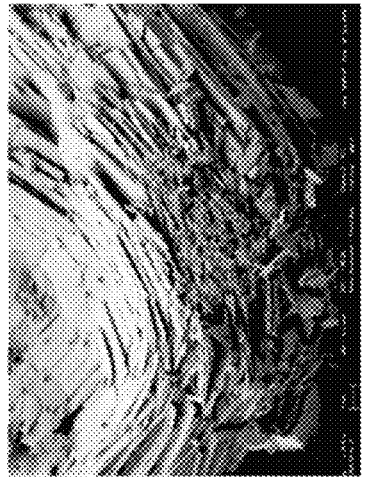
Figure 4:
Figure 4:
Figure 4:
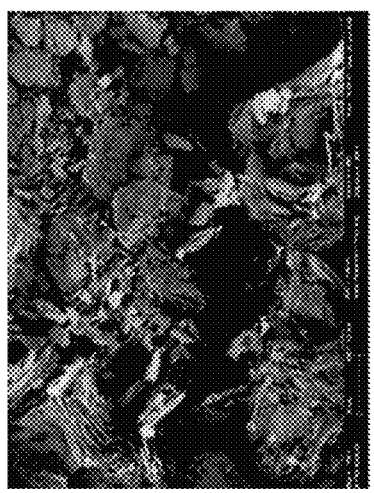
Figure 4:

The isotherms (FIG. 3) show the characteristics of the presence of the microporous space of zeolites at low pressures. However, they also show a hysteresis loop at relatively high pressures, suggesting the presence of mesoporous space. This mesoporous space is probably related to the presence of sheets of a few tens of nanometres thick that make up the particles thereof, as can be seen in FIG. 4, wherein additionally, a single morphology is shown in each image, which supports the fact that the IDM-1 material is not a mixture of particles with different structures. Table 1 summarises the information obtained from the isotherms.

TABLE 1

Micro and mesopore volumes of the calcined solids obtained in the corresponding examples.

| example | $V_{micro}$ (ml/g) | $V_{meso}$ (ml/g) |
|---|---|---|
| 2 | 0.20 | 0.07 |
| 3 | 0.21 | 0.09 |

Example 6

The same method is followed as to prepare the zeolite IDM-1 in example 2 except for the addition of aluminium isopropoxide (Al(Oi-Pr)3) together with tetraethyl orthosilicate (TEOS) in the amounts shown below:

TABLE 2

Relevant amounts in the preparation of the zeolite IDM-1 in the presence of aluminium.

| example | m(dis OH) (g) | c(OH) (mmol/g) | m(TEOS) (g) | m(Al(O-i-Pr)$_3$) (g) | Δm (g) | m(dis HF 48%) (g) |
|---|---|---|---|---|---|---|
| IDM-1-Al1 | 12.46 | 0.57 | 2.77 | 0.091 | 9.70 | 0.28 |
| IDM-1-Al2 | 12.07 | 0.57 | 2.77 | 0.045 | 9.30 | 0.28 |

Figure 5:
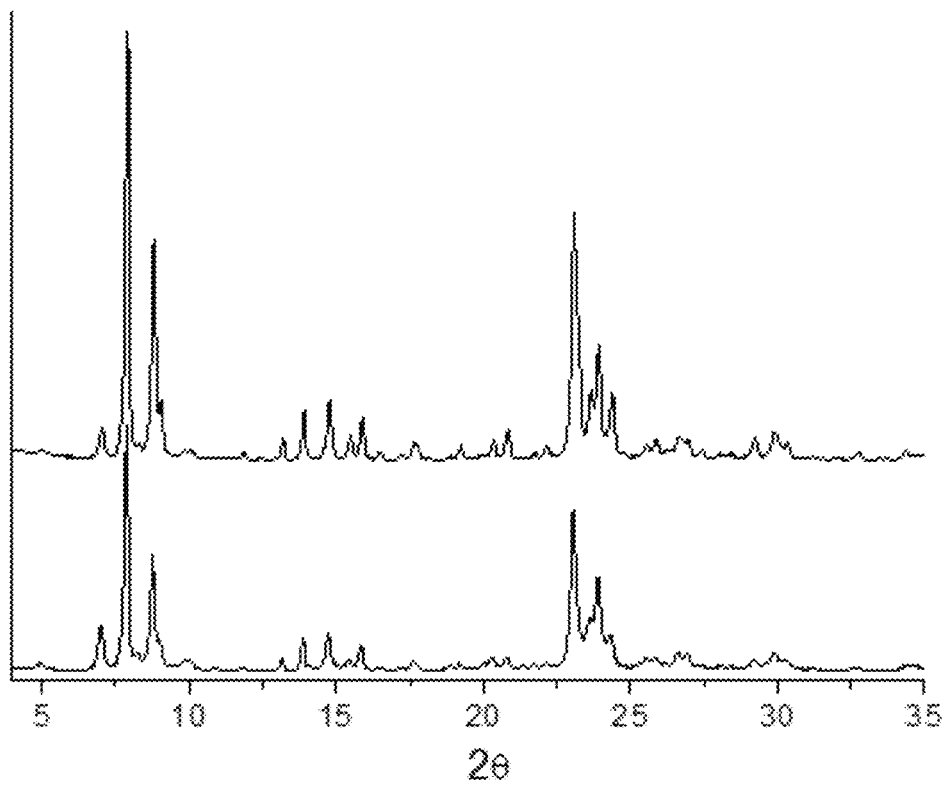
FIG. 5. Diffractograms of the calcined solids obtained in the experiments of example 6.

They are characterised by X-ray diffraction, diagrams of FIG. 5 (IDM-1-Al top and IDM-1-Al2 bottom), wherein each of the materials presents an X-ray diffractogram recorded with a Bruker diffractometer with Bragg-Brentano geometry with a fixed divergence slit and using K$\alpha_1$ and K$\alpha_2$ radiation of Cu and comprising the following angle values 2θ (°), and relative intensities (I/Io)·100, wherein the relative intensities are represented by e, f, m, j and d, with values of e=0-100, f=80-100, m=20-80, j=0-80 and d=0-20:

| IDM-1-Al1 | | | |
|---|---|---|---|
| 5.01 | 8 | 0.8 | d |
| 7.07 | 71 | 7.1 | d |
| 7.95 | 1000 | 100 | f |
| 8.35 | 26 | 2.6 | d |
| 8.85 | 535 | 53.5 | m |
| 9.12 | 117 | 11.7 | d |
| 9.91 | 18 | 1.8 | d |
| 10.17 | 14 | 1.4 | d |
| 11 | 5 | 0.5 | d |
| 11.96 | 17 | 1.7 | d |
| 12.58 | 7 | 0.7 | d |
| 13.3 | 51 | 5.1 | d |
| 14.03 | 118 | 11.8 | d |
| 14.28 | 5 | 0.5 | d |
| 14.9 | 141 | 14.1 | d |
| 15.62 | 56 | 5.6 | d |
| 16.03 | 96 | 9.6 | d |
| 16.65 | 17 | 1.7 | d |
| 17.4 | 16 | 1.6 | d |
| 17.8 | 34 | 3.4 | d |
| 17.93 | 27 | 2.7 | d |
| 18.36 | 5 | 0.5 | d |
| 19.07 | 7 | 0.7 | d |
| 19.41 | 30 | 3 | d |
| 19.66 | 3 | 0.3 | d |
| 20.15 | 11 | 1.1 | d |
| 20.54 | 46 | 4.6 | d |
| 21.06 | 68 | 6.8 | d |
| 21.65 | 7 | 0.7 | d |
| 21.97 | 15 | 1.5 | d |
| 22.39 | 29 | 2.9 | d |
| 23.31 | 538 | 53.8 | m |
| 23.5 | 214 | 21.4 | m |
| 23.91 | 144 | 14.4 | d |
| 24.18 | 258 | 25.8 | m |
| 24.64 | 155 | 15.5 | d |
| 25.03 | 16 | 1.6 | d |
| 25.51 | 6 | 0.6 | d |
| 25.83 | 32 | 3.2 | d |
| 26.15 | 44 | 4.4 | d |
| 26.48 | 12 | 1.2 | d |
| 26.64 | 15 | 1.5 | d |
| 26.91 | 42 | 4.2 | d |
| 27.06 | 24 | 2.4 | d |
| 27.25 | 44 | 4.4 | d |
| 27.72 | 22 | 2.2 | d |
| 28.37 | 14 | 1.4 | d |
| 28.74 | 16 | 1.6 | d |
| 29.19 | 4 | 0.4 | d |
| 29.56 | 47 | 4.7 | d |
| 30.23 | 68 | 6.8 | d |
| 30.66 | 31 | 3.1 | d |
| 31.08 | 4 | 0.4 | d |
| 31.56 | 14 | 1.4 | d |
| 31.91 | 3 | 0.3 | d |
| 32.22 | 4 | 0.4 | d |
| 32.47 | 6 | 0.6 | d |
| 32.89 | 4 | 0.4 | d |
| 33.11 | 18 | 1.8 | d |
| 33.78 | 3 | 0.3 | d |
| 34.06 | 4 | 0.4 | d |
| 34.74 | 20 | 2 | d |

| IDM-1-Al2 | | | |
|---|---|---|---|
| 4.95 | 24 | 2.4 | d |
| 6.98 | 208 | 20.8 | m |
| 7.83 | 1000 | 100 | f |
| 8.28 | 68 | 6.8 | d |
| 8.72 | 472 | 47.2 | m |
| 8.99 | 111 | 11.1 | d |
| 9.34 | 14 | 1.4 | d |
| 9.8 | 29 | 2.9 | d |
| 10.03 | 40 | 4 | d |
| 10.9 | 11 | 1.1 | d |
| 11.8 | 15 | 1.5 | d |
| 12.42 | 7 | 0.7 | d |
| 12.77 | 5 | 0.5 | d |
| 13.15 | 63 | 6.3 | d |
| 13.86 | 158 | 15.8 | d |
| 14.14 | 21 | 2.1 | d |
| 14.73 | 186 | 18.6 | d |
| 15.42 | 40 | 4 | d |
| 15.84 | 124 | 12.4 | d |
| 16.48 | 23 | 2.3 | d |
| 17.2 | 16 | 1.6 | d |
| 17.61 | 51 | 5.1 | d |
| 17.8 | 11 | 1.1 | d |
| 18.14 | 5 | 0.5 | d |
| 18.32 | 5 | 0.5 | d |
| 18.84 | 25 | 2.5 | d |
| 19.19 | 30 | 3 | d |
| 19.48 | 9 | 0.9 | d |
| 19.97 | 31 | 3.1 | d |
| 20.31 | 64 | 6.4 | d |

-continued

| 2θ (°) ± 0.30 (°) | | (I/Io) · 100 | |
|---|---|---|---|
| 20.79 | 65 | 6.5 | d |
| 21.35 | 20 | 2 | d |
| 21.73 | 33 | 3.3 | d |
| 22.13 | 27 | 2.7 | d |
| 23.07 | 738 | 73.8 | m |
| 23.61 | 183 | 18.3 | d |
| 23.89 | 395 | 39.5 | m |
| 24.32 | 141 | 14.1 | d |
| 24.73 | 12 | 1.2 | d |
| 25.19 | 14 | 1.4 | d |
| 25.52 | 50 | 5 | d |
| 25.85 | 48 | 4.8 | d |
| 26.2 | 22 | 2.2 | d |
| 26.61 | 83 | 8.3 | d |
| 26.94 | 70 | 7 | d |
| 27.38 | 26 | 2.6 | d |
| 28.03 | 23 | 2.3 | d |
| 28.41 | 18 | 1.8 | d |
| 28.79 | 13 | 1.3 | d |
| 29.18 | 50 | 5 | d |
| 29.58 | 23 | 2.3 | d |
| 29.86 | 90 | 9 | d |
| 30.27 | 53 | 5.3 | d |
| 30.67 | 12 | 1.2 | d |
| 31.17 | 14 | 1.4 | d |
| 31.53 | 8 | 0.8 | d |
| 31.87 | 7 | 0.7 | d |
| 32.1 | 6 | 0.6 | d |
| 32.53 | 12 | 1.2 | d |
| 32.7 | 16 | 1.6 | d |
| 33.42 | 5 | 0.5 | d |
| 33.71 | 4 | 0.4 | d |
| 34.33 | 25 | 2.5 | d |
| 34.61 | 17 | 1.7 | d |
| 34.83 | 14 | 1.4 | d |

The invention claimed is:

1. A crystalline material wherein a zeolite has a general chemical formula $SiO_{(2-x)}(OH)_{2x}$, wherein x is equal to a value between 0.02 and 0.12; and presents an X-ray diffractogram recorded with a Bragg-Brentano geometry diffractometer with a fixed divergence slit and using $K\alpha_1$ and $K\alpha_2$ radiation of Cu, and comprising the following angle values 2θ (°), and relative intensities (I/Io)·100, wherein the relative intensities are represented by e, f, m, j and d, with values of e=0-100, f=80-100, m=20-80, j=0-80 and d=0-20:

| 2θ (°) ± 0.30 (°) | (I/Io) · 100 |
|---|---|
| 5.00 | d |
| 7.06 | e |
| 7.92 | f |
| 8.31 | j |
| 8.79 | m |
| 9.01 | d |
| 9.16 | d |
| 9.38 | d |
| 9.84 | d |
| 10.05 | j |
| 10.96 | d |
| 11.28 | d |
| 11.60 | d |
| 11.86 | d |
| 12.48 | d |
| 12.84 | d |
| 13.22 | d |
| 13.94 | j |
| 14.20 | d |
| 14.80 | j |
| 14.95 | d |
| 15.12 | d |
| 15.42 | d |
| 15.64 | d |
| 15.91 | d |
| 16.12 | d |
| 16.5 | d |
| 16.64 | d |
| 17.23 | d |
| 17.66 | d |
| 17.89 | d |
| 18.39 | d |
| 18.92 | d |
| 19.25 | d |
| 19.43 | d |
| 19.57 | d |
| 20.08 | d |
| 20.24 | d |
| 20.37 | d |
| 20.58 | d |
| 20.87 | d |
| 21.03 | d |
| 21.46 | d |
| 21.80 | d |
| 22.14 | d |
| 22.34 | d |
| 22.69 | d |
| 23.14 | m |
| 23.35 | j |
| 23.73 | j |
| 23.99 | m |
| 24.15 | j |
| 24.43 | j |
| 24.77 | j |
| 25.38 | d |
| 25.6 | d |
| 26.02 | d |
| 26.36 | d |
| 26.69 | d |
| 27.04 | d |
| 27.48 | d |
| 27.65 | d |
| 27.93 | d |
| 28.16 | d |
| 28.45 | d |
| 28.73 | d |
| 28.94 | d |
| 29.37 | d |
| 29.67 | d |
| 29.98 | d. |

2. The crystalline material to claim 1, comprising a micropore volume, measured from the value of the volume of $N_2$ adsorbed to a relative pressure of 0.3 and a density in liquid state, between 0.15 ml/g and 0.25 ml/g.

3. The crystalline material according to claim 1, comprising a mesopore volume measured from the value of the volume of $N_2$ adsorbed at relative pressure 0.3 and a density in liquid state, between 0.060 ml/g and 0.250 ml/g.

4. The crystalline material according to claim 1, wherein silicon is isomorphically substituted by an element selected from Al, B, Ga, Fe, Ti, Sn, Zn, V, and any combination thereof.

5. The crystalline material according to claim 4, wherein silicon is substituted by Al in a Si/Al ratio of more than 12.

6. The crystalline material according to claim 4, wherein silicon is substituted by Ti in a Si/Ti ratio of more than 10.

7. A method for obtaining the crystalline material as described in claim 1 comprising the following steps:
 a) adding at least one source of silica to an aqueous solution of a halide of the dication (p-phenylenedimethylene)bis(tripropylammonium);
 b) adding to the mixture obtained in step (a) a source of fluorine $F^-$ selected from hydrofluoric acid and a fluorine salt, up to a pH between 12 and 5, homogenising, wherein the molar ratio of the mixture is SiO$_2$:a TF$_2$:b H$_2$O, wherein T represents the cation (p-Phenylenedimethylene)bis(tripropylammonium) and a=0.05-2 and wherein b=2-100;

c) introducing the mixture obtained in (b) in a digestion bomb and leaving with or without stirring in an oven at a temperature between 8° and 200° C., for a period of time between 1 h and 50 days;

d) cooling the mixture obtained in (c) and obtaining the solid by filtration or by centrifugation, washing with water and drying; and e) calcining in the presence of an oxidising agent the dry product obtained in step (d) at a temperature between 300° C. and 1000° C. for a period of time between 0.5 h and 2 days.

8. The method according to claim 7, wherein the halide of the dication (p-Phenylenedimethylene)bis(tripropylammonium) is found as (p-Phenylenedimethylene)bis(tripropylammonium) hydroxide, and is obtained by anion exchange from the corresponding halide.

9. The method according to claim 7, wherein after step (a) and before step (b) the mixture obtained is left to rest for a period of time between 1 h and 5 days, up to a ratio of H$_2$O:SiO$_2$ between 2 and 100, by evaporation of the solvents.

10. The method according to claim 7, wherein the digestion bomb of step (c) is selected from a static autoclave or a stirring autoclave.

11. The method according to claim 7 wherein the halide of the dication (p-Phenylenedimethylene)bis(tripropylammonium) of step (a) is made by a method comprising adding tripropylamine dropwise to a solution of 1,4-bis(chloromethyl)benzene in an ice bath, leaving under reflux and stirring for a period of time between 3 h and 7 days and separating the solvent to obtain a solid and wash it.

12. The method according to claim 7, wherein in step (b) a precursor of an element selected from among Al, B, Ga, Fe, Ti, Sn, Zn, V and any combination thereof is also added in a molar ratio between said element and silicon between 0.001 and 0.2000.

13. The method f according to claim 12, wherein the precursor is aluminium and wherein said precursor is selected from aluminium isopropoxide, aluminium nitrate or any other aluminium salt, in a molar ratio between the precursor in an equivalent oxide form, Al$_2$O$_3$ and SiO$_2$ between 0.0005 and 0.1000.

14. A catalyst comprising the crystalline material described according to claim 1.

15. A molecular sieve comprising the crystalline material described according to claim 1.

* * * * *